United States Patent [19]

Dehne

[11] 4,285,706
[45] Aug. 25, 1981

[54] PARTICULATE FILTRATION DEVICE

[76] Inventor: Manfred F. Dehne, 14350 Chrisman Rd., Houston, Tex. 77039

[21] Appl. No.: 22,284

[22] Filed: Mar. 20, 1979

[51] Int. Cl.³ .......................... B01D 45/12; B04C 5/26
[52] U.S. Cl. ........................................ 55/343; 55/349; 55/412; 210/512.2
[58] Field of Search ................... 55/343, 345, 346–349, 55/411, 412; 209/144; 210/512 M

[56] References Cited

U.S. PATENT DOCUMENTS

| Re. 25,099 | 12/1961 | Hoffmann | 209/144 |
|---|---|---|---|
| 1,333,325 | 3/1920 | McGee | 55/347 |
| 1,844,369 | 2/1932 | Ross | 55/412 |
| 2,553,175 | 5/1957 | Davenport et al. | 55/343 |
| 2,583,921 | 1/1952 | Yellott | 55/348 |
| 3,415,042 | 12/1968 | Wilson | 55/348 |
| 3,631,657 | 1/1972 | Wilson | 55/348 |
| 3,747,306 | 7/1973 | Wikdahl | 55/349 |

Primary Examiner—David L. Lacey
Attorney, Agent, or Firm—Pravel, Gambrell, Hewitt, Kirk, Kimball & Dodge

[57] ABSTRACT

A device for the filtration of particulate from a particulate laden gas, including a housing containing a circumferential, vertically stacked arrangement of separator units and transfer structure to transfer the particulate laden gas, the clean gas and the separated particulate between the housing inlets and outlets.

12 Claims, 6 Drawing Figures

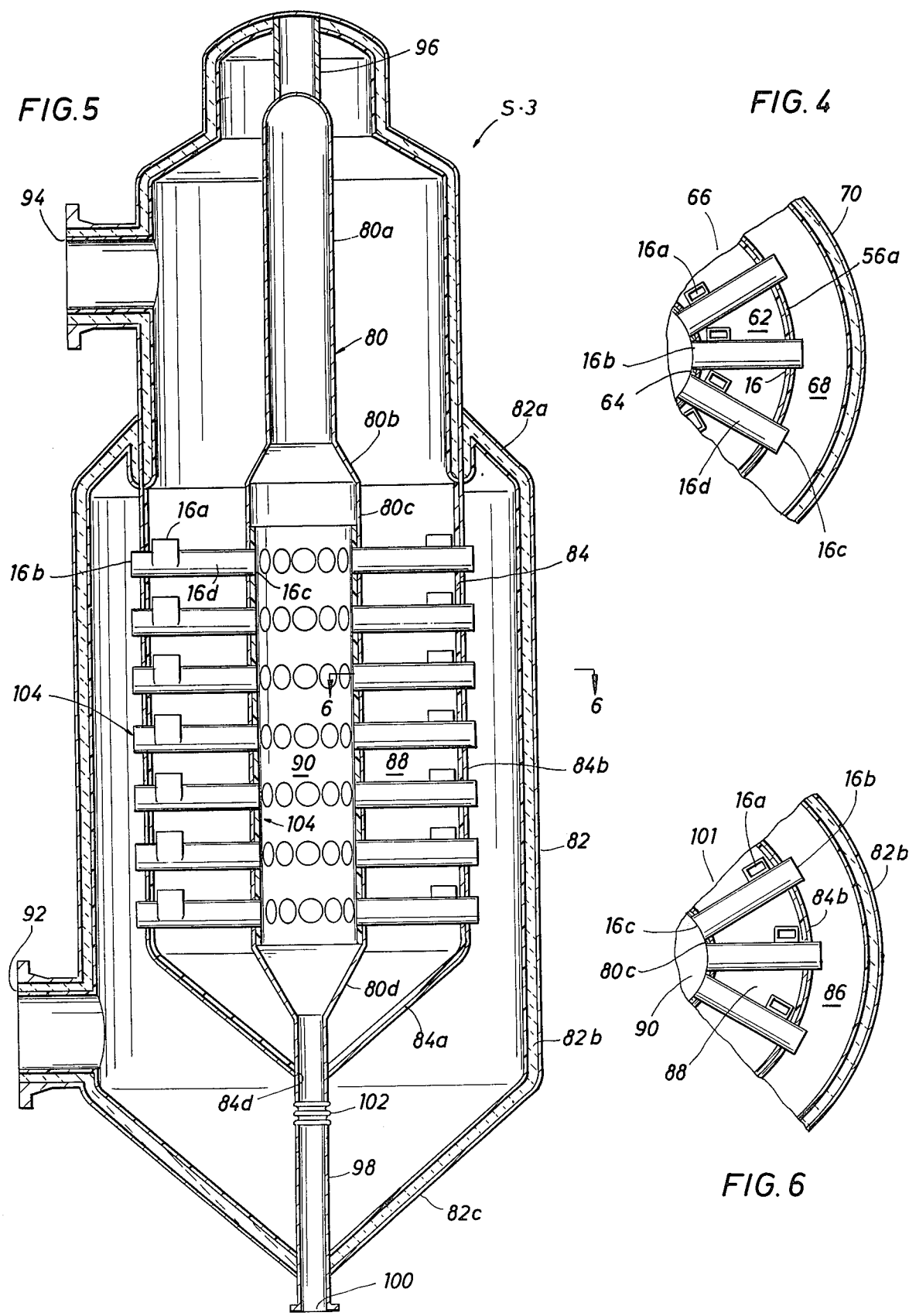

PARTICULATE FILTRATION DEVICE

FIELD OF THE INVENTION

This invention relates to devices for the separation of solid particulates from gases, including but not limited to high temperature, high pressure environments.

PRIOR ART

Removal of particulates in a high temperature environment is needed in many industrial applications such as conventional power generation utilizing solid fuels. Development of the magnetohydrodynamic power regeneration process (MHD) is still in its early stages mainly due to lack of an efficient filtration system capable of retrieving valuable seed material dispersed in a high-temperature fluidal. High-temperature particulate removal will also be necessary for the high-temperature, gas-cooled reactor (HTGR) employing $CO_2$ coolant flowing through a bed of radioactive BeO spheres. Small particles of BeO from these spheres will inevitably be entrained and must be removed. The necessity for another, quite effective high-temperature, high-pressure particulate removal system is called for in catalytic cracking processes, where small particles of catalyst entrained in the high-temperature, high-pressure flue gases leaving the regenerator have to be removed prior to being released to the atmosphere. Like in many other industrial applications, the problem in catalytic cracking processes is solved at the expense of being exceedingly wasteful of the still inherent energy in the flue gas. The available energy of the dust laden flue gases has to be expended before the particulates can be removed, thus not taking full advantage of the potential energy. If an efficient particulates removal system that could operate efficiently in such environment were available, this high-temperature high-pressure flue gas could be used as an energy source in a heat-exchanger, power recovery-turbine or both. In instances where such energy recovery is already practiced, a need still exists for greatly improved gas cleaning since the convection surfaces, and turbine blades erode/corrode in a relatively short time period, necessitating replacement which is both expensive and disruptive. The failure to develop such a particle collection device remains one of the fundamental barriers to the development of direct, coal fired, power generating systems, for instance.

Aside from various reported unsuccessful attempts to utilize the principle of sound agglomeration, virtually all other removal techniques are based upon cyclonic action, i.e. fines are primarily separated by centrifugal force from the flue gases of the catalytic cracking regenerator. One advanced filtration system, known to the inventor is Shell Oil Company "Third Stage Separator" as described in the literature (Hydrocarbon Processing, March 1976 and September 1977). This unit can be classified as a member of the multicyclone family. A multitude of smaller but, otherwise conventional, cyclone collectors are arranged in a single substantially horizontal plane inside a pressure vessel with their longitudinal axis pointing in a substantially vertical direction. Particle laden gases are introduced vertically into each participating cyclone via an annulus formed by the center tube and the outer cylinder wall and which is fitted with a segmented, circular swirl device comparable to the guide vanes in pumps as well as other rotating equipment. The pressure vessel from the Shell Third Stage Separator is subdivided into three chambers. The dust laden gases enter through a center chamber which is interposed between an upper chamber—through which substantially cleaned gas leaves the system and a lower chamber, where particulates are collected. One of the problems with this system is that at higher temperatures all internal components inside the vessel expand considerably, thus causing high stresses and possible failures. In order to limit material stresses caused by expansion, it has been found necessary in some cases to introduce a waterspray into the flue gas.

The Shell device meets certain minimum requirements acceptable by manufacturers of expander turbines with respect to achieving a reasonable blade life for the expander turbines for a certain period of time, however, in at least some instances, particle collection efficiency has not been adequate as yet to meet environmental standards in the event that flue gases would be discharged directly to atmosphere from the expander turbines.

SUMMARY OF THE INVENTION

One purpose of this invention is to provide a particulate filtration system capable of sustaining high separation efficiencies in high-temperature, high-pressure environments with excellent potential of meeting environmental standards as well as minimizing wear in power recovery equipment, such as expander turbines. This object is achieved by the use of a plurality of separator units, each with an inlet and two outlets, mounted in a circumferential, vertically stacked arrangement within a main vessel housing with an inlet and two outlets, and three transfer means within the main vessel housing to transfer particulate laden gas, cleaned gas and particulate between the respective inlets and outlets. The actual scope of the invention is set forth in the claims.

DESCRIPTION OF THE DRAWINGS

FIG. 4 is a partial cross section of FIG. 3 at 4—4 illustrating part of one horizontal plane of separator units;

FIG. 5 is a sectional view of another preferred embodiment similar to FIG. 3 wherein the cleaned gas and the particulate are transferred out of the main vessel at or near the bottom thereof; and FIG. 6 is a partial cross section of FIG. 5 at 6—6 illustrating part or one plane of separator units.

DESCRIPTION OF PREFERRED EMBODIMENT

Figure 1:
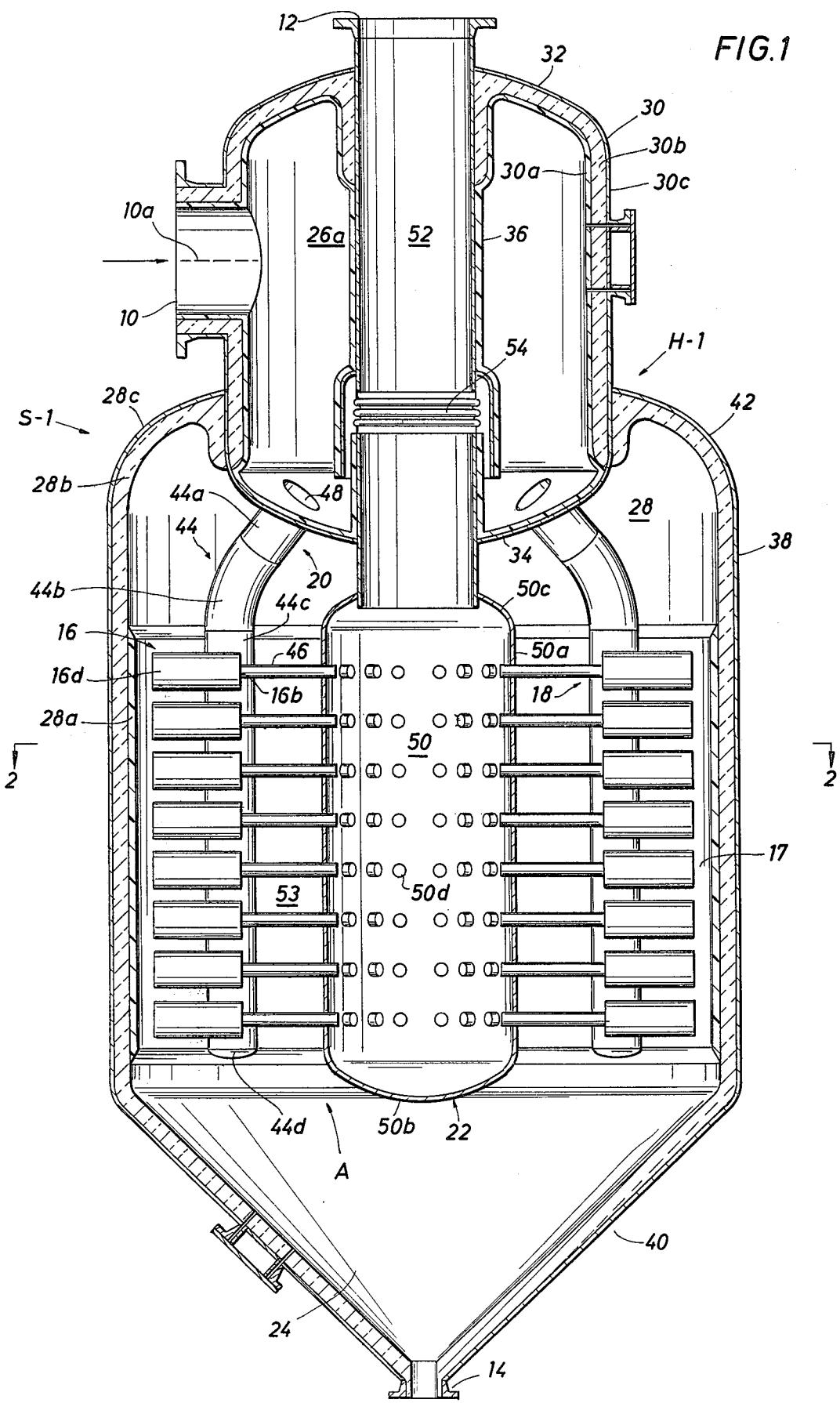
FIG. 1 is a sectional view of one preferred embodiment of a particulate filtration system.

Referring to the drawings, FIG. 1 shows a preferred embodiment of the present invention including a particulate filtration system S-1 for receiving particulate laden gas and separating particulate and particles from such particulate laden gas to produce particulate and cleaned gas. The particulate filtration system S-1 includes a main vessel housing H-1 with an inlet 10 for the entrance of particulate laden gas, a first outlet 12 for the exiting of cleaned gas and a second outlet 14 for the exiting of particulate. A separator assembly A with a plurality of separator units 16 are mounted in the vessel housing H-1 by a separator support means 18 which mounts the separator units 16 in a circumferential, vertically stacked arrangement.

Each separator unit 16 includes an inlet 16a (shown in FIG. 2), a first outlet 16b for the exiting of cleaned gas and a second outlet 16c for the exiting of particulate. Particulate laden gas transfer means 20 is mounted in the vessel housing H-1 for transferring particulate laden gas from the main vessel inlet 10 to the separator unit inlets 16a. A cleaned gas transfer means 22 is mounted in the housing H-1 for transferring cleaned gas from separator outlets 16b to housing outlet 12; and a particulate transfer means 24 is mounted in the housing H-1 for allowing the separated particulate to flow from separator unit outlets 16c to vessel housing outlet 14.

The main vessel housing H-1 is divided into a cylindrical entry section 26 and a main section 28. The entry section 26 is generally torus-shaped with a cylindrically shaped outer midportion 30, a dome-shaped top portion 32, a bottom portion 34 and a cylindrically-shaped inner portion 36. The cylindrically-shaped midportion 30 and inner portion 36 cooperate to form an annular chamber 26a.

The wall of the cylindrically-shaped midportion 30 is composed of three layers; an interior layer 30a, an exterior layer 30c and a middle layer 30b in between interior layer 30a and exterior layer 30c. Interior layer 30a is a material selected to have good wear against the abrasive qualities of the particulate laden gas to be filtered. Exterior layer 30c is designed to have good wearing properties against the environment outside of the particulate filtration system S-1 and middle layer 30b is chosen for its temperature insulation properties as well as strength. The materials to be chosen would depend upon the environment the system was to be used in. Top portion 32 is similarly constructed. Bottom portion 34 is constructed of the abrasion-resistant material of interior layer 30a and the material of layer 30c. Inner portion 36 is constructed solely of the abrasion-resistant material of interior layer 30a.

The main vessel housing inlet 10 mounted in entrance section 26 allows the entrance of particulate laden gas into the chamber 26a. The inlet 10 is adapted to connect to a supply of particulate laden gas, flue gas in the case of a fluid catalytic cracker. The axis 10a of the inlet 10 is approximately parallel to the tangent of the cylindrically shaped midportion 30 at the site that the inlet 10 is connected to the midportion 30. This causes the particulate laden gas that enters the entry section 26 to flow approximately tangentially parallel to the interior wall 30a of cylindrically shaped midportion 30 as it enters, which causes a generally vortical flow within the entry section annular chamber 26a, reducing the abrasion on the inner wall of the entry section and causing better distribution of the particulate laden gas within the entry section annular chamber 26a.

The main section 28 of the main vessel housing H-1 includes a cylindrically shaped midsection 38, a frustoconical shaped bottom section 40 and a top section 42 having an opening of inner diameter sufficient for receiving the entry vessel section 26. The bottom section 40 is tapered downwardly and located at its lowest point is the main housing vessel second outlet 14 for the exiting of particulate. The construction of the walls of the main section 28 is similar to that of the entry section 26 with an interior layer 28a designed for the abrasive qualities of the particulate, a middle layer 28b designed for strength and temperature expansion and an exterior layer or wall 28c designed for protection from the exterior environment of the particulate filtration system S-1. The interior layer 28a is mounted only on the portion of the main section 28 opposite the separator units 16 where the particulate strikes as described hereinafter.

Figure 2:
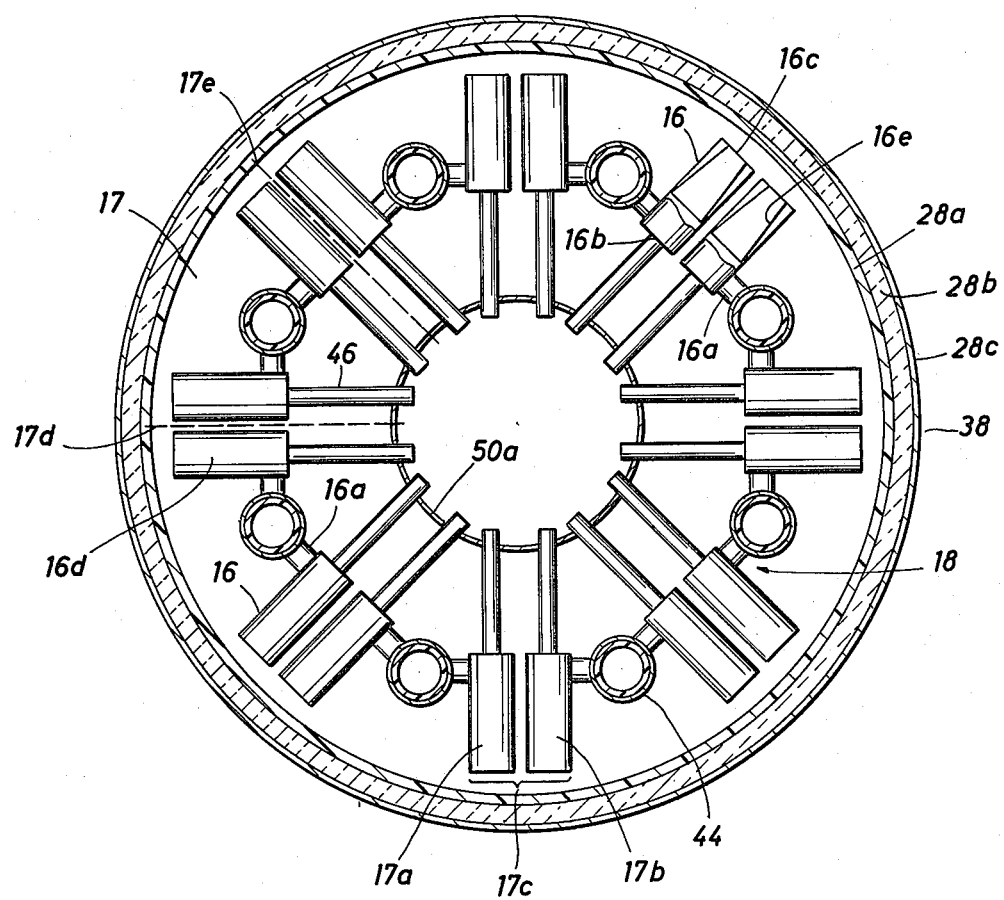
FIG. 2 is a cross section of FIG. 1 at 2—2 illustrating one plane of separator units.

The separation of the particulate laden gas into clean gas and particulate is done by the separator units 16 which may be cyclone separators such as disclosed in U.S. Pat. No. 3,802,570 issued to Manfred F. Dehne on Apr. 9, 1974. Referring to FIG. 2, such a cyclone separator unit 16 consists of a cylindrical housing 16d having the inlet 16a for bringing particulate laden gas into the main housing conical interior 16e, in a tangential flow which causes the particulate laden gas to form a vortex moving towards a second outlet 16c for particulate where the vortex reverses bringing the clean gas out a first outlet 16b for cleaned gas while the particulate is carried by its own momentum out the second outlet 16c. Any type of separator working from a pressure differential will work in the present invention.

The separator units 16 in the preferred embodiment of the separator assembly A are divided into planar set 17 of sixteen units mounted in a common horizontal plane, as seen in FIG. 2 although a planar set could have a different number of separators. Each planar set is in a single plane perpendicular to the vertical axis of the main vessel housing. Each planar set of circumferentially spaced separator units 16 is divided into eight pairs 17c with each pair, such as units 17a and 17b, being aligned parallel to a horizontal central line 17e, which is a radial. Each pair's central radial 17e is 45° from the central line of an adjacent pair.

The inlet 16a of each separator unit 16 is connected and in communication with a distribution conduit 44, with each conduit 44 serving pairs of adjacent non-parallel separator units, such as 17a and 17f.

The second outlet 16c for particulate exiting of each separator unit 16 is open to the interior of the main section 28. The first outlet 16b of each separator unit 16 is connected to a radially extending cleaned gas conduit 46 which connects with the cleaned gas transfer means 22.

As many planar sets 17 as necessary to produce the desired capacity may be vertically spaced along the distribution conduits 44. Each set 17 is identical to and superimposed over the set below. Eight sets 17 are shown in FIG. 1. Each additional set 17 requires only the lengthening of the midsection 38 of the main section 28, the distribution conduit 44 and of the cleaned gas transfer means 22, thus the strength of the structure need only increase linearly rather than exponentially. The separator units 16 are actually supported by connection to the vertically extending distribution conduits 44.

The particulate laden gas transfer means 20 includes the entry section 26 and the distribution conduits 44. Formed in the bottom portion 34 of the entry section 26 are eight conduit orifices 48 equally spaced in a circular path. The conduit holes 48 communicate with the eight distribution conduits 44 in the main section 28. The distribution conduits 44 are welded to the conduit orifices 48 in a gas tight manner. The distribution conduits are built with a top portion 44a which is cylindrically shaped, elbow shaped midportion 44b and a cylindrically shaped main portion 44c which is in a substantially vertical position. The midsection 44b is designed to change the angle of the distribution conduits 44 from an angle which is 90° from the tangential of the bottom portion 34 to the substantially vertical position of the main section 44c. Each distribution conduit 44 ends in a cap 44d at the lowest part of the main segment 44c. Each separator unit inlet 16a is mounted to the main section 44c. Therefore, the particulate laden gas enters the entry section 26 through the main vessel housing inlet 10, forms a vortex in the entry section 26, is distributed through the conduit orifices 48 into the eight distribution conduits 44, from where it enters the separator unit inlets 16a.

The cleaned gas transfer means 22 consists of the cleaned gas conduits 46, a generally cylindrical internal housing member 50 mounted inside of the separator units 16 and the distribution conduits 44 and cylindrical cleaned gas upper outlet conduit 52. The internal housing member 50 has a cylindrical wall section 50a, a closed bottom 50b and a top portion 50c which is connected to the cleaned gas outlet conduit 52. The end of each cleaned gas conduit 46 connected to the separator unit outlet 16b extends through an opening 50d in the cylindrical wall section 50a far enough to maintain connection in spite of radial expansion or contraction of the cylindrical wall section 50a.

The cleaned gas outlet conduit 52 which rises vertically from the internal housing member top portion 50c rises within the entry chamber inner midportion 36 and terminates in the main vessel housing first or upper outlet 12 mounted at substantially the top of the main vessel housing H-1. Along the length of the cleaned gas outlet conduit 52 is an expansion joint 54, designed in ways well known in the art, to allow movement by the internal member 50 from changes in temperature within the main vessel housing H-1. The first outlet 12 for cleaned gas is adapted to connect to wherever it is desired to direct the cleaned gas, such as a turbine air blower.

The particulate transfer means 24 in this preferred embodiment consists of the particulate chamber 53 formed in the main vessel housing H-1 outside of the internal housing member 50 and conduits 44. The particulate upon exiting from the second outlet of the separator units 16c falls by gravity into the bottom section 40 of the main section 28 and exits, also by gravity, out the second outlet 14 of the particulate filtration system S-1 from which it will be transferred to any destination, such as the regenerator stage of a fluid catalytic cracker.

Figure 3:
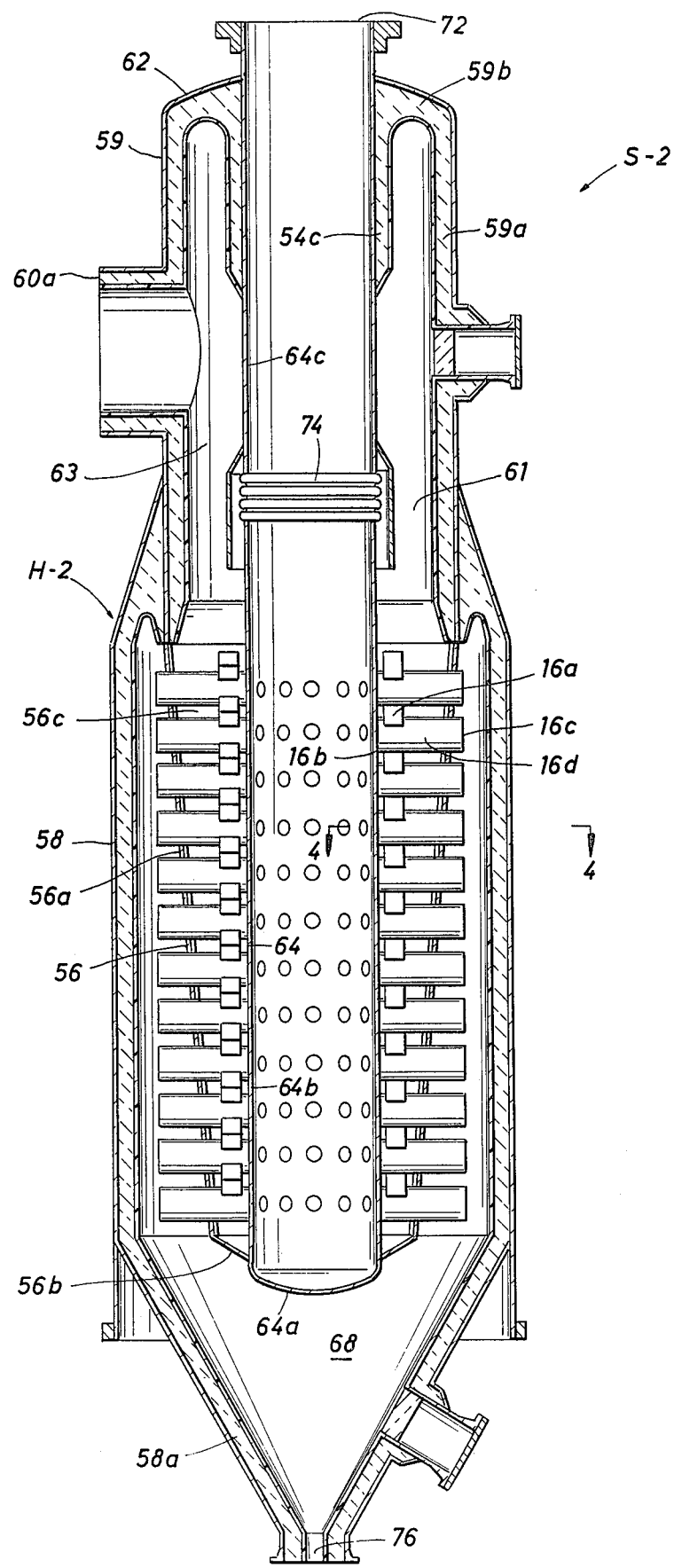
FIG. 3 is a sectional of another preferred embodiment similar to FIG. 1.

FIGS. 3 and 4 are sectional views of another preferred embodiment S-2. The particulate filtration system S-2 of this embodiment is similar to the embodiment of FIG. 1 but there is an intermediate housing member 56 in place of the plurality of circumferentially spaced distribution conduits 44. This replacement of the distribution conduits 44 provides for a simpler and therefore less expensive construction, which may be preferred, particularly in construction of particle filtration systems with a large capacity.

In this S-2 embodiment, the main vessel housing H-2 includes a main vessel section 58 and an entry housing section 59. The particulate laden gas transfer means 61 includes an annular entry chamber 63 formed in the entry vessel section 62 and an intermediate housing member 56. The particulate laden gas enters the inlet 60a of entry housing section 59, which inlet is oriented similarly to the inlet 10 in S-1 so as to cause a vortical flow in the entry housing section 59 and a continuation of that flow in the intermediate housing member 56.

The intermediate housing member 56 consists of a frusto-conical main section 56a with the widest segment vertically highest and connected to the bottom of the inlet section 59, and an annular bottom portion 56b connecting the intermediate housing member 56 to the internal housing member 64. The entry housing section 59 is formed by a cylindrical, outer midportion 59a, a top portion 59b formed in a curved annular ring and a cylindrical inner midportion 59c. The internal housing member 64 is a cylindrical internal vessel including a closed bottom end 64a, main cylindrical or tubular section 64b, expansion joint 74 and upper cylindrical or tubular section 64c. The upper section 64c is mounted in an opening in the top 59b of the inlet vessel section 59.

The separator units 16 may be identical to those of FIG. 2 with an inlet 16a, a first outlet 16b for clean gas and a second outlet 16c for particulate. In this embodiment, the separator units 16 would be radially positioned by mounting through the intermediate housing member 56 and the internal housing member 64 at each end of the separator unit body 16d. The inlet 16a of each vertically stacked separator unit 16 would be open to the interior chamber 56c of the intermediate housing member 56 to accept the particulate laden gas. The separator units 16, as seen in FIG. 4, which shows part of one planar set 66 of such separator units, are evenly, circumferentially spaced along the walls of the intermediate housing section 56 and internal housing member 64, with each separator unit inlet 16a being located near the internal housing member 64 so that the cleaned gas will flow out the first exit 16b into the internal housing member 64 and the particulate out the second outlet 16c into the particulate transfer means 68 formed between the intermediate housing member 56 and the main vessel section 58. The mounting of the separator units 16 through the intermediate housing member 56 and the internal housing member 64 provides for reaction to temperature changes without disruption of the system.

The construction of the rest of the particulate filtration system S-2 is similar to that of the embodiment shown in FIG. 1 with a first outlet 72 for clean gas being located on the top portion of the upper cylindrical or tubular section 64c. The second outlet 76 is for particulate and is located on bottom tapered portion 58a of the main vessel section 58 and in communication with the particulate transfer means 68. The construction and insulation materials are designed similarly to the embodiment shown in FIG. 1. The main vessel housing H-2 is somewhat more elongated because of the larger number of planar sets of separators, indicating the increased capacity of the particulate filtration system S-2.

FIGS. 5 and 6 show alternative embodiment S-3 of the particulate filtration system of the present invention in which the internal housing member 80 is part of the particulate transfer means 104 and an outer annular chamber receives the cleaned gas. This alternative embodiment includes a main housing vessel 82, an intermediate housing vessel 84 and a generally cylindrical internal housing member 80. Formed between the main housing vessel 82 and the intermediate housing vessel 84 is an annular cleaned gas receiving chamber 86. Formed between the intermediate housing vessel 84 and the internal housing member 80 is an annular particulate laden gas chamber 88. Formed within the internal housing member 80 is a particulate chamber 90. The main housing vessel 82 includes a frusto-conical top portion 82a, a cylindrical midportion 82b and a frusto-conical bottom portion 82c. The cleaned gas outlet 92 is located along the lower section of the midportion 82b radially outward from the intermediate housing member 84. The cleaned gas outlet 92 is adapted to be connected to desired depository of the cleaned gas.

The intermediate housing vessel 84 has a bottom portion 84a which is frusto-conically shaped, a cylindrical shaped midsection 84b and a irregular dome shaped top portion 84c. The particulate laden gas inlet 94 is located along the upper portion of the midsection 84b and is oriented similarly to the inlet 10 of the first embodiment S-1 so as to cause the vortical flow within the intermediate housing vessel 84b.

The internal housing member 80 includes a cylindrically shaped top portion 80a connected by support structure 96 to the top portion 84c of the intermediate housing vessel. A cylindrically shaped midsection 80c is connected to frusto-conically shaped connecting section 80b, which connects to the top portion 80a. A frusto-conical bottom portion 80d connects to the particulate conduit 98 which goes through intermediate housing vessel opening 84d and exits through the particulate outlet 100 located substantially at the bottom of the main vessel housing 82. Vertical expansion of the internal collection member 80 is allowed by an expansion joint 102 of conventional construction located on the particulate conduit 98 between the intermediate housing vessel outlet 84d and the particulate outlet 100.

Separator support means 104 includes the intermediate housing vessel 84 and internal housing member 80 which mounts the separator units 16 in a circumferential, vertically stacked arrangement. The circumferentially spaced, vertically stacked separator units 16 are mounted through the walls of the intermediate housing vessel midsection 84b and the midsection 80c of the internal housing member 80. They are mounted in planar sets 101, (part of one being shown in FIG. 6) each identical to and superimposed over the planar sets below. Each planar set 101 has a number of separators 16, each placed along a radius of the cylindrical shaped midsection 80c of the internal housing member 80. The angle between each pair of adjacent separator units 16 within a planar set is equal. The cleaned gas first outlet 16b extends outwardly through the intermediate housing vessel midsection 84b to allow communication with the cleaned gas outlet 92, while the second separator outlet 16c for particulate is mounted through the internal housing member midsection 80c to allow exiting of particulate through the particulate outlet 100. The inlet 16a is open to the particulate laden gas chamber 90.

The materials for construction can be similar to those of the other embodiments, changing only to reflect the substance each wall is exposed to.

The foregoing disclosure and description of the invention are illustrative and explanatory thereof and various changes in the size, shape and materials as well as the details of the illustrated construction may be made without departing from the spirit of the invention.

I claim:

1. A particulate filtration system for receiving particulate laden gas and separating particulate from such particulate laden gas to produce a cleaned gas, comprising:

a vessel housing including an entry housing section and a main vessel section, said entry housing section having an inlet adapted to receive particulate laden gas and a cleaned gas outlet and said main vessel section having a particulate vessel outlet;

particulate laden gas transfer means mounted substantially in said main vessel section for transferring particulate laden gas from said entry section into said main vessel section, said particulate laden gas transfer means including a generally cylindrical transfer structure positioned substantially in said main vessel section, and mount means for mounting said generally cylindrical transfer structure within said main vessel section depending from and in fluid communication with said entry housing section for receiving particulate laden gas flowing into said entry housing section;

a separator assembly positioned in said main vessel section and including a plurality of separator units for separating received particulate laden gas into particulate and cleaned gas, each separator unit including an inlet adapted to receive particulate laden gas and a particulate outlet and a cleaned gas outlet;

cleaned gas transfer means including a generally cylindrical internal housing member;

internal mount means mounting said internal housing member in said entry housing section and in said main vessel section for receiving cleaned gas from said cleaned gas outlets of said separator units and directing said cleaned gas outwardly of said cleaned gas outlet of said entry housing section;

said internal housing member being positioned in said main vessel section substantially inwardly of said separator units and said generally cylindrical transfer structure;

said generally cylindrical transfer structure and said internal housing member cooperating to provide separator support means for mounting said separator units in a circumferential, vertically stacked arrangement with the inlets of said separator units being in fluid communication with said particulate laden gas transfer means and the cleaned gas outlets of said separator units being in fluid communication with said internal housing member; and, particulate transfer means mounted in said main vessel section for transferring particulate from said particulate outlets of said separator units to said main vessel section particulate outlet.

2. The system set forth in claim 1, including:

said internal mount means mounting said internal housing member of said cleaned gas transfer means substantially concentrically within said generally cylindrical transfer structure of said particulate laden gas transfer means.

3. The system set forth in claim 2, including:

said cleaned gas outlet of said entry housing section is located at the top of said vessel housing.

4. The system set forth in claim 2, including:

said separator support means mounting said circumferential, vertically stacked separator units in a plurality of separate substantially horizontal planes of circumferentially arranged separator units;

said generally cylindrical transfer structure of said particulate laden gas transfer means includes a plurality of substantially vertically directed, circumferentially spaced conduits extending from fluid communication with said entry housing section inlet into connection with each of said particulate inlets of said vertically stacked separator units; and each of said plurality of substantially vertically directed, circumferentially spaced conduits is connected to said inlets of adjacently positioned separator units positioned in substantially the same horizontal plane.

5. The system set forth in claim 4, comprising:

means for attaching the upper end of said substantially vertical conduits to said entry housing section of said vessel housing in order to suspend said vertical conduits within said vessel housing free of other attachments to said vessel housing; and means for attaching said internal housing member to said entry housing section of said vessel housing in order to suspend said internal housing member within said main vessel section free of other attachments to said vessel housing.

6. The system set forth in claim 4, including:

said entry housing section having a bottom portion having circumferentially spaced orifices;

said substantially vertical conduits being attached to said entry housing section bottom portion over said orifices and extending substantially vertically downwardly in said main vessel section; and said bottom portion of said entry housing section further having another opening with said internal housing member being attached thereto.

7. The system set forth in claim 1, wherein said particulate transfer means includes:

a substantially annular particulate chamber formed in said main vessel section outside of said generally cylindrical transfer structure, said particulate chamber being in fluid communication with said particulate outlet of each separator unit and the particulate outlet of said main vessel section to allow for transferring particulate from each of said separator units outwardly of said housing.

8. The system set forth in claim 1, wherein:

the cleaned gas transfer means further comprises a cleaned gas conduit radially extending from the cleaned gas outlet of each separator unit to said generally cylindrical internal housing for transferring cleaned gas thereto.

9. The system set forth in claim 1, wherein:

said generally cylindrical transfer structure is an intermediate housing member mounted concentrically about said internal housing member in fluid communication with said separator unit inlets.

10. The system set forth in claim 9, wherein:

said intermediate housing member includes a tapered, frusto-conical section tapered inwardly within said main vessel section.

11. The system set forth in claim 10, further comprising:

means for mounting said internal housing member of said cleaned gas transfer means and said intermediate housing member of said particulate laden gas transfer means to said entry housing section in order to suspend said intermediate housing member and said internal housing member within said main vessel section free of other attachments to said vessel housing.

12. The system set forth in claim 1, including:

said entry housing section having said inlet positioned at a tangential locus to cause substantially radial, tangential entry of the particulate laden gas in order to create a substantially vortical flow within said generally cylindrical transfer structure.

* * * * *